(12) United States Patent
Koguchi et al.

(10) Patent No.: US 7,036,021 B2
(45) Date of Patent: Apr. 25, 2006

(54) IMAGE DISPLAY DEVICE

(75) Inventors: Tatsushi Koguchi, Saitama-ken (JP); Norihiro Usuda, Ibaraki-ken (JP); Kazuhiro Hakuno, Ibaraki-ken (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 1009 days.

(21) Appl. No.: 10/026,535

(22) Filed: Dec. 27, 2001

(65) Prior Publication Data

US 2002/0138749 A1    Sep. 26, 2002

(30) Foreign Application Priority Data

Mar. 26, 2001  (JP)  ............................. P2001-087799
Oct. 5, 2001  (JP)  ............................. P2001-309670

(51) Int. Cl.
*G06F 11/30* (2006.01)
*H04N 7/167* (2006.01)

(52) U.S. Cl. ...................................... 713/194; 380/201
(58) Field of Classification Search ..................... None
See application file for complete search history.

(56) References Cited

U.S. PATENT DOCUMENTS 5,912,621 A * 6/1999 Schmidt ..................... 340/571
6,223,285 B1 * 4/2001 Komuro et al. ............. 713/160

FOREIGN PATENT DOCUMENTS

JP  9-261217   10/1997
JP  11-073309   3/1999

* cited by examiner

*Primary Examiner*—Gilberto Barron
*Assistant Examiner*—Kristin M. Derwich
(74) *Attorney, Agent, or Firm*—Nath & Associates PLLC; Gary M. Nath; Gregory B. Kang

(57) ABSTRACT

An authentication/decryption unit authenticates and decrypts video signals received from a video signal output device. An open-condition detector detects the open condition of a cabinet. A memory stores therein one of a first flag indicating that an authentication operation of the authentication/decryption unit is enabled and a second flag indicating that an authentication operation of the authentication/decryption unit is disabled. A micro-controller controls whether the authentication operation of the authentication/decryption unit will be enabled or disabled according to the flag in the memory. When the open-condition detector detects that the cabinet is opened, the micro-controller writes the second flag into the memory.

8 Claims, 3 Drawing Sheets

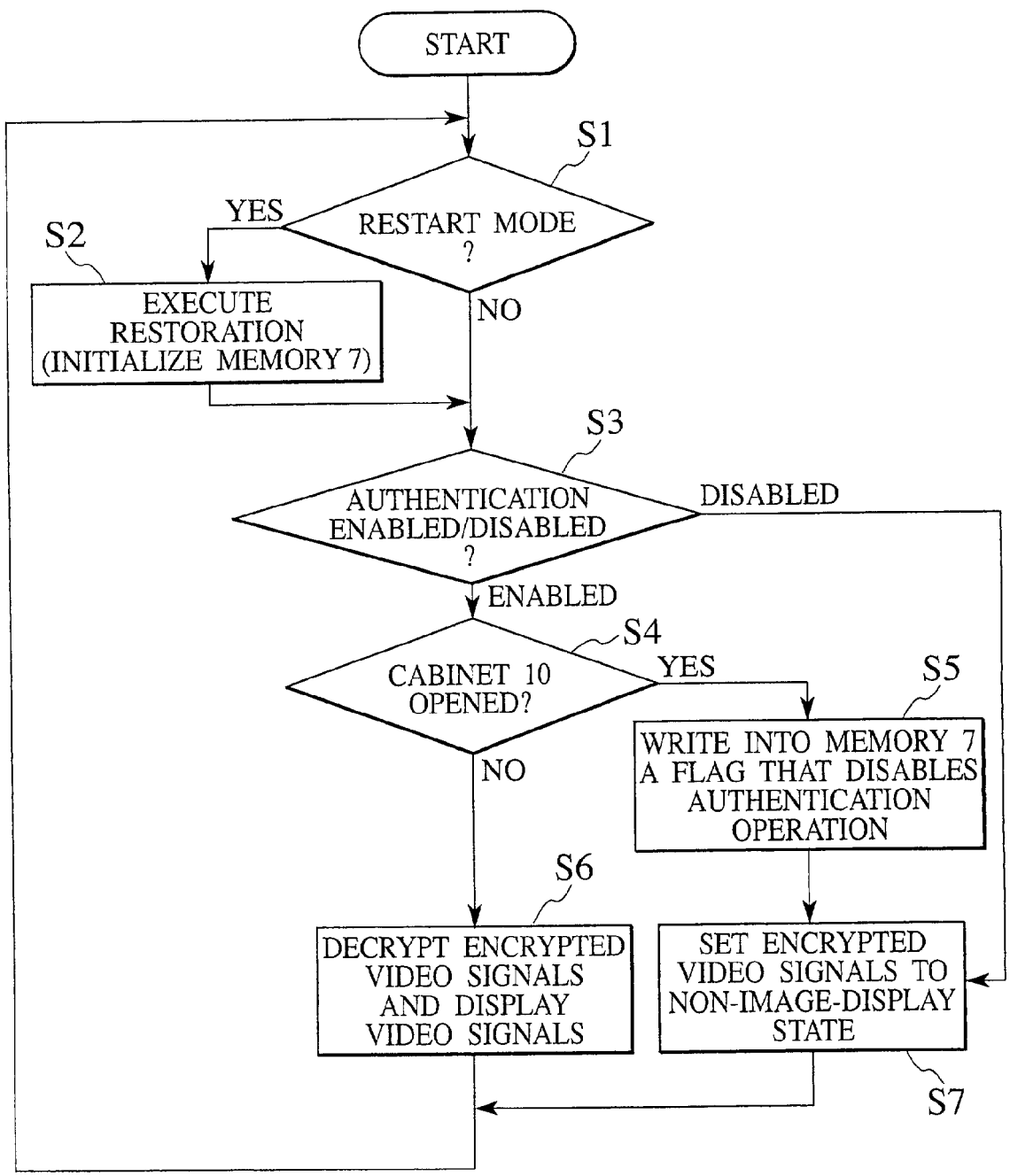

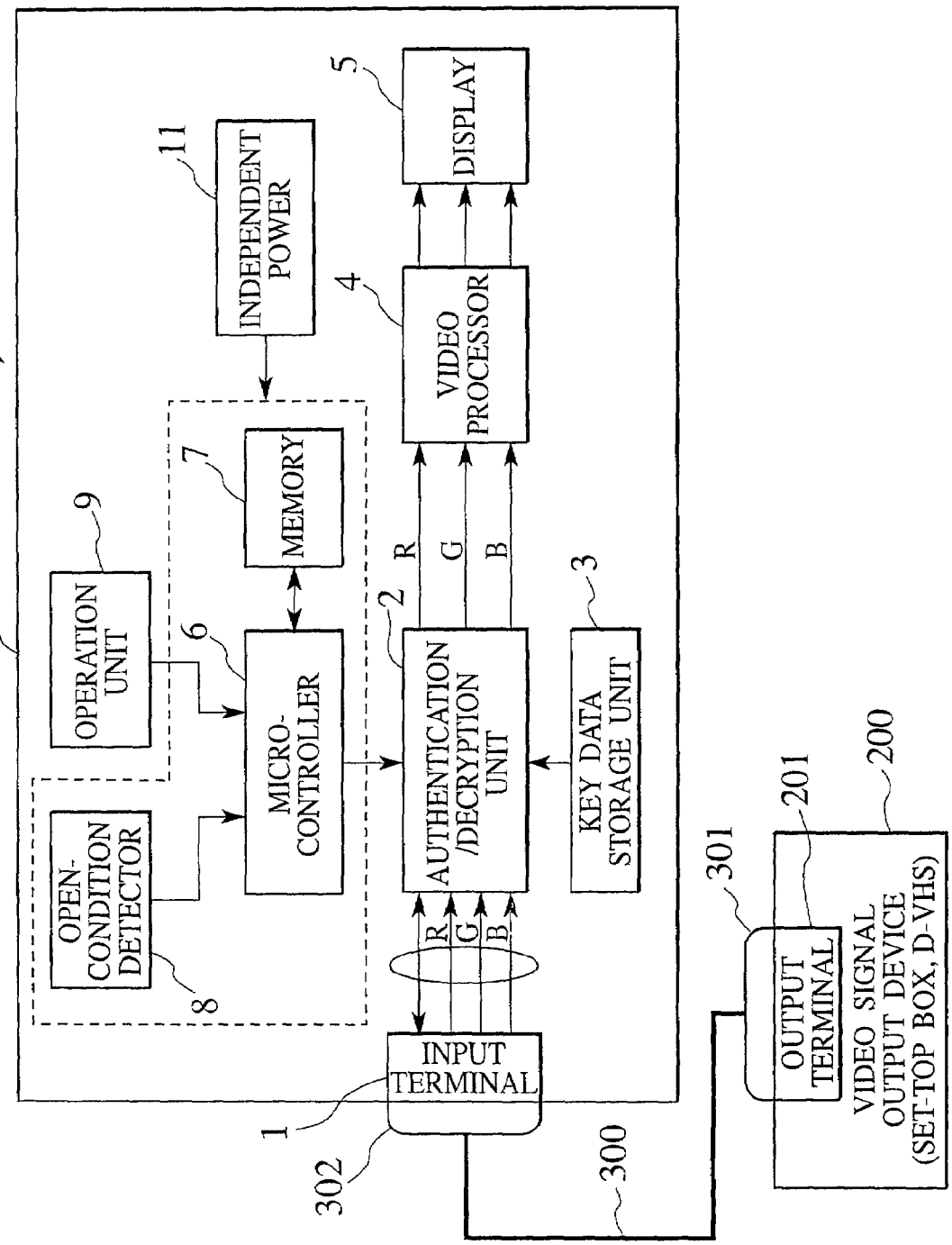

IMAGE DISPLAY DEVICE

BACKGROUND OF THE INVENTION

1. Field of the Invention

The present invention relates to an image display device that decrypts encrypted video signals and displays the decrypted video signals as an image, and more particularly to an image display device that prevents decrypted video signals from being acquired or copied illegally.

2. Description of the Related Art

Copyright protection of video signals (contents) is very important on a video apparatus, such as an image display device, that processes video signals. A recent digital technology finds many applications in the broadcasting and video fields with more and more digital video signals received by the image display devices of home television sets. An example of digital video signals is baseband digital video signals that are encrypted to prevent an illegal copy. An image display device that processes digital video signals, such as the one described above, has a decryptor that decrypts encrypted video signals and displays them on the display as an image.

An image display device has connectors, wires, or circuit board wirings in its inside that are exposed. Because video signals output from the decryptor are already decrypted, the image display device allows a person to intentionally open the cover of the image display device to illegally take out the decrypted video signals output from the decryptor. Therefore, the problem with this type of image display device is that, unless some countermeasures are taken, the video signals (contents) may be acquired or copied illegally.

One of the ways to prevent the illegal acquisition or illegal copy of video signals is to eliminate exposed parts by protecting the exposed connectors, wires, or wirings inside the image display device to prevent video signals from being taken out. However, this method is not preferable because it decreases the design flexibility of the image display device and increases the cost. In addition, because it is relatively easy to remove the protection of exposed parts to take out video signals, this method does not efficiently prevent an illegal acquisition or an illegal copy.

It is expected that more and more encrypted video signals will be used in the future and that the protection of contents copyrights will become more and more important. Therefore, the copyright protection of encrypted video signals is very important and there is a need for an effective solution.

SUMMARY OF THE INVENTION

In view of the foregoing, it is an object of the present invention to provide an image display device that simply and efficiently prevents encrypted video signals from being acquired or copied illegally.

To solve the above problems, there is provided an image display device that has an authentication/decryption unit for authenticating and decrypting encrypted video signals and a display for displaying video signals thereon, the image display device comprising: open-condition detecting means for detecting whether a cabinet of the image display device is opened; storing means for storing one of a first flag indicating that an authentication operation of the authentication/decryption unit is enabled and a second flag indicating that the authentication operation of the authentication/decryption unit is disabled; flag writing means for writing the second flag into the storing means when the open-condition detecting means detects that the cabinet is opened; enabling/disabling control means for controlling enabling/disabling of the authentication operation of the authentication/decryption unit according to the flag stored in the storing means; first display control means for putting the display in a first state by displaying the video signals decrypted from the encrypted video signals when the flag stored in the storing means is the first flag; and second display control means for putting the display in a second state, which is different from the first state, when the flag stored in the storing means is the second flag.

According to the present invention, the image display device comprises the open-condition detecting means, storing means, flag writing means, enabling/disabling control means, first display control means, and second display control means.

The open-condition detecting means detects whether the cabinet of the image display device is opened. The storing means stores one of the first flag indicating that an authentication operation of the authentication/decryption unit is enabled and the second flag indicating that the authentication operation of the authentication/decryption unit is disabled. The flag writing means writes the second flag into the storing means when the open-condition detecting means detects that the cabinet is opened. The enabling/disabling control means controls enabling/disabling of the authentication operation of the authentication/decryption unit according to the flag stored in the storing means. The first display control means puts the display in the first state by displaying the video signals decrypted from the encrypted video signals when the flag stored in the storing means is the first flag. The second display control means puts the display in the second state, which is different from the first state, when the flag stored in the storing means is the second flag.

Therefore, the illegal acquisition or copy of encrypted video signals may be efficiently protected by a relatively simple method.

In a preferred embodiment of the present invention, the image display device further comprises hidden command entering means for entering a hidden command for returning the authentication operation of the authentication/decryption unit to an enabled state by causing the flag writing means to write the first flag into the storing means in which the second flag is stored.

In a preferred embodiment of the present invention, the image display device further comprises an independent power that supplies power to the open-condition detecting means, the storing means, and the flag writing means to allow the open-condition detecting means, the storing means, and the flag writing means to continue operation even when power normally supplied to the image display device is turned off.

To solve the above problems, there is provided an image display device that has an authentication/decryption unit for authenticating and decrypting encrypted video signals and a display for displaying video signals thereon, the image display device comprising: detecting means for detecting that there is a possibility that video signals, decrypted from the encrypted video signals by the authentication/decryption unit, will be taken out of the image display device; storing means for storing one of a first flag indicating that an authentication operation of the authentication/decryption unit is enabled and a second flag indicating that the authentication operation of the authentication/decryption unit is disabled; flag writing means for writing the second flag into the storing means when the detecting means detects that there is a possibility that the video signals decrypted from the encrypted video signals will be taken out of the image display device; enabling/disabling control means for controlling enabling/disabling of the authentication operation of the authentication/decryption unit according to the flag stored in the storing means; first display control means for putting the display in a first state by displaying the video signals decrypted from the encrypted video signals when the flag stored in the storing means is the first flag; and second display control means for putting the display in a second state, which is different from the first state, when the flag stored in the storing means is the second flag.

According to the present invention, the image display device comprises the detecting means, storing means, flag writing means, enabling/disabling control means, first display control means, and second display control means.

The detecting means detects that there is a possibility that video signals, decrypted from the encrypted video signals by the authentication/decryption unit, will be taken out of the image display device. The storing means stores one of the first flag indicating that the authentication operation of the authentication/decryption unit is enabled and the second flag indicating that the authentication operation of the authentication/decryption unit is disabled. The flagwriting means writes the second flag into the storing means when the detecting means detects that there is a possibility that the video signals decrypted from the encrypted video signals will be taken out of the image display device. The enabling/disabling control means controls enabling/disabling of the authentication operation of the authentication/decryption unit according to the flag stored in the storing means. The first display control means puts the display in the first state by displaying the video signals decrypted from the encrypted video signals when the flag stored in the storing means is the first flag. The second display control means puts the display in the second state, which is different from the first state, when the flag stored in the storing means is the second flag.

Therefore, the illegal acquisition or copy of encrypted video signals may be efficiently protected by a relatively simple method.

In a preferred embodiment of the present invention, the image display device further comprises hidden command entering means for entering a hidden command for returning the authentication operation of the authentication/decryption unit to an enabled state by causing the flag writing means to write the first flag into the storing means in which the second flag is stored.

In a preferred embodiment of the present invention, the image display device further comprises an independent power that supplies power to the detecting means, the storing means, and the flag writing means to allow the detecting means, the storing means, and the flag writing means to continue operation even when power normally supplied to the image display device is turned off.

The nature, principle and utility of the invention will become more apparent from the following detailed description when read in conjunction with the accompanying drawings.

BRIEF DESCRIPTION OF THE DRAWINGS

In the accompanying drawings:

FIG. 2 is a flowchart showing the operation of a device of the present invention; and FIG. 3 is a block diagram showing another embodiment of the present invention.

DESCRIPTION OF THE PREFERRED EMBODIMENTS

Figure 1:
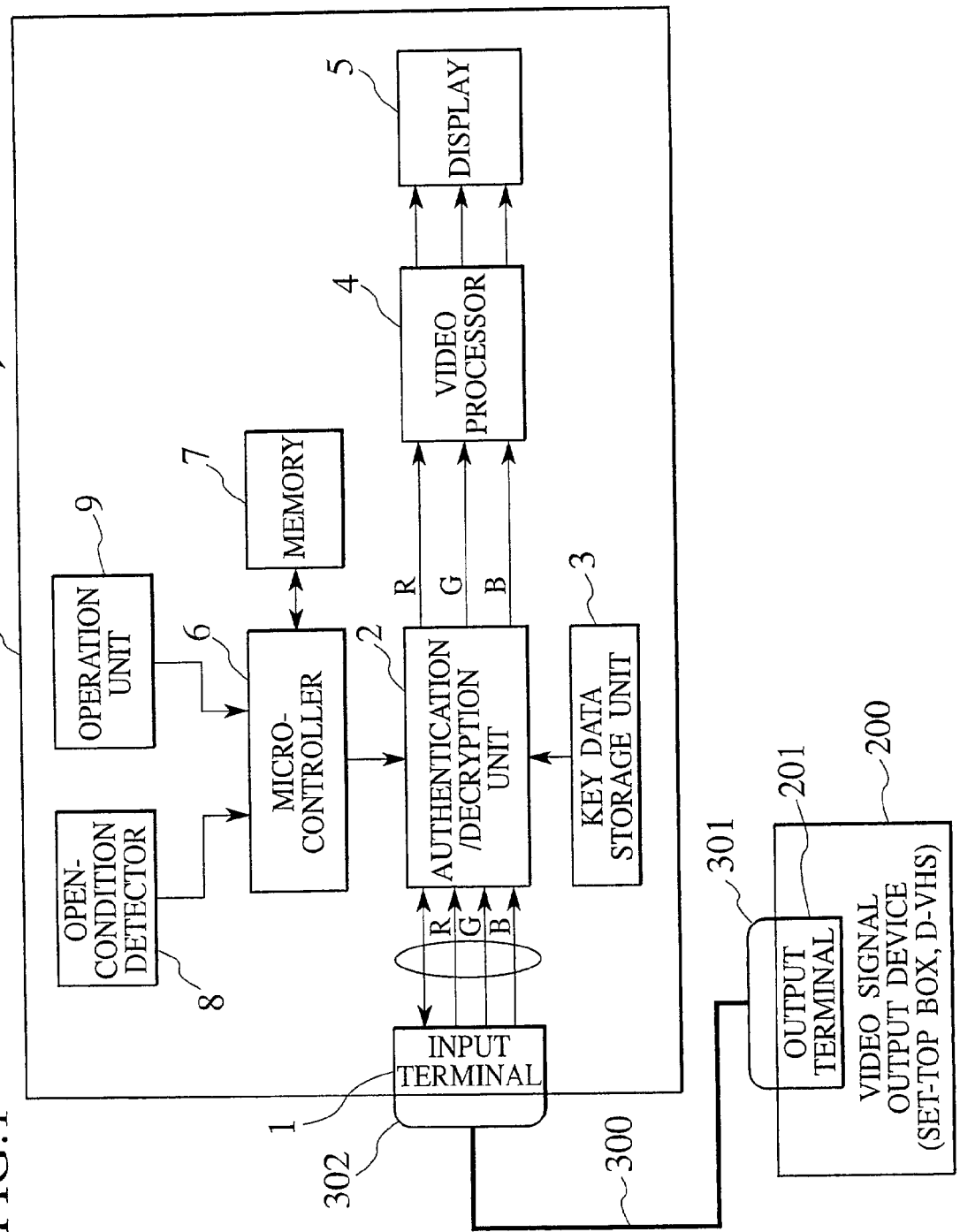
FIG. 1 is a block diagram showing an embodiment of the present invention.

An image display device according to the present invention will be described below with reference to the drawings.

Referring to FIG. 1, an image display device 100 that is an embodiment of the present invention and a video signal output device 200 such as a set-top box or a D-VHS (registered trademark of successor of this application) are connected by a cable 300. A connector 301 of the cable 300 is connected to an output terminal 201 of the video signal output device 200, and a connector 302 is connected to an input terminal 1 of the image display device 100. Encrypted baseband digital video signals (hereinafter called encrypted video signals) reproduced or demodulated by the video signal output device 200 are sent to the image display device 100 via the cable 300. The encrypted digital video signals are not limited to baseband signals but may be compressed signals.

In this embodiment, the encrypted video signals are three primary color signals, R, G, and B. In addition to the R, G, and B signals, various control signals are transmitted (communicated) between the image display device 100 and the video signal output device 200 via the cable 300. The R, G, and B signals received by the input terminal 1 are sent to an authentication/decryption unit 2. The authentication/decryption unit 2 uses key data, stored in a key data storage unit 3, to communicate with the video signal output device 200 via the cable 300 to execute the authentication procedure. The authentication/decryption unit 2 checks if the user is successfully authenticated (if the user is allowed to decrypt encryption data) as a result of authentication communication and, only if the user is successfully authenticated, outputs decrypted R, G, and B signals.

A micro-controller 6 controls whether or not the authentication/decryption unit 2 is to perform the authentication operation. This will be described later. The key data storage unit 3 comprises, for example, a read-only memory (ROM). How the authentication/decryption unit 2 processes key data received from the key data storage unit 3 and what is transferred between the video signal output device 200 and the authentication/decryption unit 2 for authentication are not open to protect the copyright of the encrypted video signals.

The R, G, and B signals output from the authentication/decryption unit 2 are sent to a video processor 4. The video processor 4 performs normal video processing such as image quality adjustment and then sends the signals to a display 5 such as a cathode ray tube (CRT). Then, the video signals decrypted from the encrypted video signals are displayed as an image on the display 5. The display 5 is not limited to a CRT, but any display means such as a video projection screen or a plasma display may be used. It should be noted that the signals which are not encrypted video signals and which are non-encrypted normal video signals sent from other input terminals or internal tuners, not shown in the figure, are sent to the video processor 4, not via the authentication/decryption unit 2, and then to the display 5 for display thereon.

Next, the configuration for preventing an illegal acquisition and an illegal copy of video signals decrypted from encrypted video signals will be described. A memory 7, an open-condition detector 8 detecting that a cabinet 10 is open, and an operation unit 9 are connected to the micro-controller 6. The open-condition detector 8 comprises, for example, a photo sensor such as a sulfide cadmium (CdS cell) or silicon diode and detects the surrounding brightness to detect whether the cabinet 10 is open. When the open-condition detector 8 comprises a photo sensor, the peripheral circuit of the photo sensor is configured so that the difference in luminance between when the cabinet 10 is shut (the rear cover is installed on the front cover) and when the cabinet 10 is open (the rear cover is removed from the front cover) may be detected. In this case, the sensing part of the photo sensor is stuck, for example, on the rear cover.

When the memory 7 is shipped from the factory, it contains a flag which has the initial value (for example, "0") indicating that the authentication operation is enabled (allows the authentication operation). When a person opens the cabinet 10 in an attempt to take out video signals decrypted from encrypted video signals, the open-condition detector 8 detects the action and sends the detection signal to the micro-controller 6. In response to the detection signal from the open-condition detector 8, the micro-controller 6 causes the authentication/decryption unit 2 to overwrite a flag (for example "1") into the memory 7 to disable the authentication operation of the authentication/decryption unit 2 (disallows the authentication operation). The micro-controller 6 acts as flag writing means.

The micro-controller 6 prevents the authentication/decryption unit 2 from performing the authentication operation when the memory 7 contains the flag ("1") indicating that the authentication operation of the authentication/decryption unit 2 is to be disabled. The micro-controller 6 acts also as enabling/disabling means that controls whether the authentication operation of the authentication/decryption unit 2 is to be enabled or disabled.

Therefore, once the cabinet 10 is opened, the authentication/decryption unit 2 does not perform the authentication operation for the encrypted video signals. In this case, even if the encrypted signals are regular signals that should be decrypted after the authentication operation, they are not decrypted but output directly from the authentication/decryption unit 2. Thus, a person who attempts to acquire or copy the video signals illegally cannot take out the video signals, which are decrypted from the encrypted signals, from the cabinet 10. In this case, noises are displayed on the display 5 because the encrypted video signals are displayed.

The memory 7, a nonvolatile memory, retains the flag in the memory 7 even if the power of the image display device 100 is turned off. Therefore, even if the cabinet 10 is shut and then the power is turned on again, the authentication operation of the authentication/decryption unit 2 cannot be enabled again without performing the restoration operation that will be described later. If an independent power (backup power), which is turned on or off independently of the power of the image display device 100, is used for the micro-controller 6, the memory 7, and the open-condition detector 8, the open condition of the cabinet 10 may be detected even when the power of the image display device 100 is turned off. This configuration is a more preferable embodiment because the open condition of the cabinet 10 may be detected even when the image display device 100 is turned off.

FIG. 3 shows the more preferable embodiment in which the open condition of the cabinet 10 may be detected even when the power of the image display device 100 is turned off. In FIG. 3, the same structural elements as those in FIG. 1 have the same reference numerals, and their descriptions are omitted if not necessary. As shown in FIG. 3, the image display device 100 has an independent power 11 that is separate from the power (main power) of the image display device 100. The independent power 11 is a battery or a large-capacity capacitor. The independent power 11 supplies power to the micro-controller 6, memory 7, and open-condition detector 8 to keep them running even when the power of the image display device 100 is turned off. It is desirable that the independent power 11 be used only when the power of the image display device 100 is turned off.

This configuration allows the open condition of the cabinet 10 to be detected when the power of the image display device 100 is turned off, making it possible to prevent, more efficiently, video signals from being acquired or copied illegally.

Although, in the above example, the open-condition detector 8 detects that the cabinet 10 is opened, it is also possible to detect that the cabinet 10 has a hole drilled on it or that the cabinet 10 is destroyed. The open condition of the cabinet 10 includes all conditions such as an opened cover, a hole in the cabinet, and the destruction of a cabinet, and all conditions substantially equivalent to those actions. The open-condition detector 8 is not limited to a photo sensor but a mechanical sensor such as a mechanical switch may be used and, in addition, a photo sensor and a mechanical sensor may be combined. The open-condition detector 8 may have any configuration.

The micro-controller 6 needs only to have the ability to run a small program at a low speed. The micro-controller 6 may be dedicated to control the enabling/disabling of the authentication operation of the authentication/decryption unit 2 or may be combined with a controller provided for executing other functions. The micro-controller 6 with a program memory or a nonvolatile memory in which a program is written and then protected against reading, if used, would prevent the program from being read. This type of micro-controller, which is not expensive, would not increase the cost of the image display device 100.

As described above, when the cabinet 10 is opened and there is a possibility that the video signals decrypted from encrypted video signals might be illegally acquired or copied, the image display device 100 causes the micro-controller 6 to disable (disallow) the authentication operation of the authentication/decryption unit 2. Thus, the video signals decrypted from the encrypted video signals cannot be take out from the cabinet and therefore the contents copyright is protected. Note that, if an decryption inhibit condition, such as a key mismatch, occurs in the image display device 100 of the present invention, the user is not authenticated to decrypt the encrypted video signals even when the authentication operation of the authentication/decryption unit 2 is enabled.

The cabinet 10 must be opened also at a service time, for example, when the image display device 100 is manufactured, repaired, or inspected at a factory. In such a case, the authentication operation described above is disabled. Therefore, the device must have a configuration that allows the authentication operation of the authentication/decryption unit 2, once disabled, to be enabled again (restarted).

In FIGS. 1 and 3, the operation unit 9 is provided to restore the disabled authentication operation of the authentication/decryption unit 2 back to the enabled state. Although provided in the cabinet 10 in FIGS. 1 and 3, the operation unit 9 may be a switch (operation key) on the image display device 100 or may be a remotely controlled transmitter outside the cabinet 10. The operation unit 9 need not be dedicated to the restoration operation but may be combined with a switch, such as the power switch, that is used for other purposes. Through the operation unit 9, the operator may enter a restoration password or perform a predefined setting for a jumper or a switch to give a restoration instruction to the micro-controller 6. The password, jumper setting, or switch setting is a hidden command provided for the restoration operation.

In response to the authentication operation restoration instruction entered via the hidden command from the operation unit 9, the micro-controller 6 initializes the memory 7 and resets the flag of the authentication operation of the authentication/decryption unit 2 to the enable state ("0"). This returns the authentication operation of the authentication/decryption unit 2 to the enabled state, that is, the initial state, allowing the authentication/decryption unit 2 to communicate again with the video signal output device 200 for executing the authentication procedure and to decrypt the encrypted video signals.

The above-described operation of the image display device 100 according to the present invention will be described with reference to the flowchart in FIG. 2. In step S1 in FIG. 2, the hidden command is entered from the operation unit 9 and a check is made to see if the mode is the restart mode. If the mode is the restart mode, restoration processing is performed in step S2 to initialize the memory 7 and then control is passed to step S3. If the mode is not the restart mode, control is passed directly to step S3. In step S3, the flag in the memory 7 is checked to see if the authentication operation of the authentication/decryption unit 2 is enabled or disabled. If the authentication operation of the authentication/decryption unit 2 is disabled, control is passed to step S7.

If, in step S3, the authentication operation of the authentication/decryption unit 2 is found enabled, a check is made in step S4 to determine if the cabinet 10 is opened. If the result of the checking does not indicate that the cabinet 10 is opened, control is passed to step S6. In step S6, the video signals decrypted from the encrypted video signals are displayed as an image and then control returns to step S1. If the result of the checking indicates that the cabinet 10 is opened, control is passed to step S5 and, in step S5, the flag ("1") that will disable the authentication operation of the authentication/decryption unit 2 is overwritten into the memory 7. Then, control is passed to step S7. In step S7, the video signals decrypted from the encrypted video signals are set to the non-display state and then control returns to step S1.

Steps S1–S7 described above are repeated regularly or at a predetermined interval. Note that steps S1–S5 are processing or a judgment in the micro-controller 6. Steps S6 and S7 are processing in the authentication/decryption unit 2, video processor 4, and display 5. The image non-display setting processing for video signals decrypted from encrypted video signals in step S7 refers to processing in which the video signals decrypted from the encrypted video signals are set up such that they are not displayed on the display 5. Because in this embodiment, if the authentication operation of the authentication/decryption unit 2 is disabled or if the cabinet 10 is opened, the authentication/decryption unit 2 does not perform the authentication operation and therefore does not output the video signals decrypted from the encrypted video signals.

When the image non-display setting processing in step S7 is performed, the encrypted video signals are output directly to the authentication/decryption unit 2 and noises are displayed on the display 5. The image non-display setting processing also includes processing in which the video processor 4 mutes the cumbersome noise to the non-signal state, the display displays a single-color screen such as a blue screen, or a warning message is displayed on the screen of the display 5 to indicate that the encrypted video signals cannot be authenticated or the encrypted video signals are not displayed because there is a possibility of illegal actions.

In step S6, the video signals decrypted from encrypted video signals are displayed correctly on the display 5 as an image. In this case, the display 5 is in a first state. When the display 5 in the first state, the authentication/decryption unit 2 and the video processor 4 act as first display control means. In step S7, noises are displayed on the display 5, the non-signal state occurs in which no image is displayed, or a single-color screen or a warning signal is displayed. In this case, the display 5 is in a second state that is different from the first state. When the display 5 is in the second state, the authentication/decryption unit 2 and the video processor 4 act also as second display control means.

Of course, the image display device 100 does not have an output terminal via which video signals decrypted from encrypted video signals are output. Therefore, the encrypted video signals may be used only for decryption in the closed image display device 100 for display on the display 5. As long as there is no possibility that the video signals decrypted from the encrypted video signals will be taken out of the image display device, the first display control means displays the video signals, decrypted from the encrypted video signals, correctly on the display 5 as an image. When there is a possibility that the video signals decrypted from the encrypted video signals will be taken out of the image display device, the second display control means prevents the video signals, decrypted from the encrypted video signals, from being displayed as an image.

It should be noted that non-encrypted normal video signals, independent of the first and second display control means, are always displayed correctly on the display 5. Therefore, the method according to the present invention that prevents video signals, decrypted from encrypted video signals, from illegally being taken out does not affect normal video signals.

The present invention is not limited to the embodiments described above but may be modified in various ways without departing from the spirit of the present invention. For example, the open-condition detector 8 is simply one preferable example used to easily detect a condition in which there is a possibility that video signals, decrypted from encrypted video signals by the authentication/decryption unit 2, will be taken out of the image display device 100. Instead of this detector, more sophisticated detection means may also be used. In addition, although encrypted video signals are supplied from the external video signal output device 200 in the embodiments, encrypted video signals maybe supplied also from an internal tuner or from a recording medium such as a tape cassette or a disk.

It should be understood that many modifications and adaptations of the invention will become apparent to those skilled in the art and it is intended to encompass such obvious modifications and changes in the scope of the claims appended hereto.

What is claimed is:

1. An image display device that has an authentication/decryption unit for authenticating and decrypting encrypted video signals and a display for displaying video signals thereon, said image display device comprising:

open-condition detecting means for detecting whether a cabinet of said image display device is opened;

storing means for storing one of a first flag indicating that an authentication operation of said authentication/decryption unit is enabled and a second flag indicating that the authentication operation of said authentication/decryption unit is disabled;

flag writing means for writing said second flag into said storing means when said open-condition detecting means detects that said cabinet is opened;

enabling/disabling control means for controlling enabling/disabling of the authentication operation of said authentication/decryption unit according to the flag stored in said storing means;

first display control means for putting said display in a first state by displaying the video signals decrypted from the encrypted video signals when the flag stored in said storing means is the first flag; and second display control means for putting said display in a second state, which is different from the first state, when the flag stored in said storing means is the second flag.

2. The image display device according to claim 1, further comprising hidden command entering means for entering a hidden command for returning the authentication operation of said authentication/decryption unit to an enabled state by causing said flag writing means to write said first flag into said storing means in which said second flag is stored.

3. The image display device according to claim 1, further comprising an independent power that supplies power to said open-condition detecting means, said storing means, and said flag writing means to allow said open-condition detecting means, said storing means, and said flag writing means to continue operation even when power normally supplied to said image display device is turned off.

4. The image display device according to claim 2, further comprising an independent power that supplies power to said open-condition detecting means, said storing means, and said flag writing means to allow said open-condition detecting means, said storing means, and said flag writing means to continue operation even when power normally supplied to said image display device is turned off.

5. An image display device that has an authentication/decryption unit for authenticating and decrypting encrypted video signals and a display for displaying video signals thereon, said image display device comprising:

detecting means for detecting that there is a possibility that video signals, decrypted from the encrypted video signals by said authentication/decryption unit, will be taken out of said image display device;

storing means for storing one of a first flag indicating that an authentication operation of said authentication/decryption unit is enabled and a second flag indicating that the authentication operation of said authentication/decryption unit is disabled;

flag writing means for writing said second flag into said storing means when said detecting means detects that there is a possibility that the video signals decrypted from the encrypted video signals will be taken out of said image display device;

enabling/disabling control means for controlling enabling/disabling of the authentication operation of said authentication/decryption unit according to the flag stored in said storing means;

first display control means for putting said display in a first state by displaying the video signals decrypted from the encrypted video signals when the flag stored in said storing means is the first flag; and second display control means for putting said display in a second state, which is different from the first state, when the flag stored in said storing means is the second flag.

6. The image display device according to claim 5, further comprising hidden command entering means for entering a hidden command for returning the authentication operation of said authentication/decryption unit to an enabled state by causing said flag writing means to write said first flag into said storing means in which said second flag is stored.

7. The image display device according to claim 5, further comprising an independent power that supplies power to said detecting means, said storing means, and said flag writing means to allow said detecting means, said storing means, and said flag writing means to continue operation even when power normally supplied to said image display device is turned off.

8. The image display device according to claim 6, further comprising an independent power that supplies power to said detecting means, said storing means, and said flag writing means to allow said detecting means, said storing means, and said flag writing means to continue operation even when power normally supplied to said image display device is turned off.

* * * * *